Dec. 24, 1946.　　　　　　W. H. DE LANCEY　　　　　2,413,036
FLUID DISPENSING APPARATUS
Filed March 31, 1945　　　　4 Sheets-Sheet 3

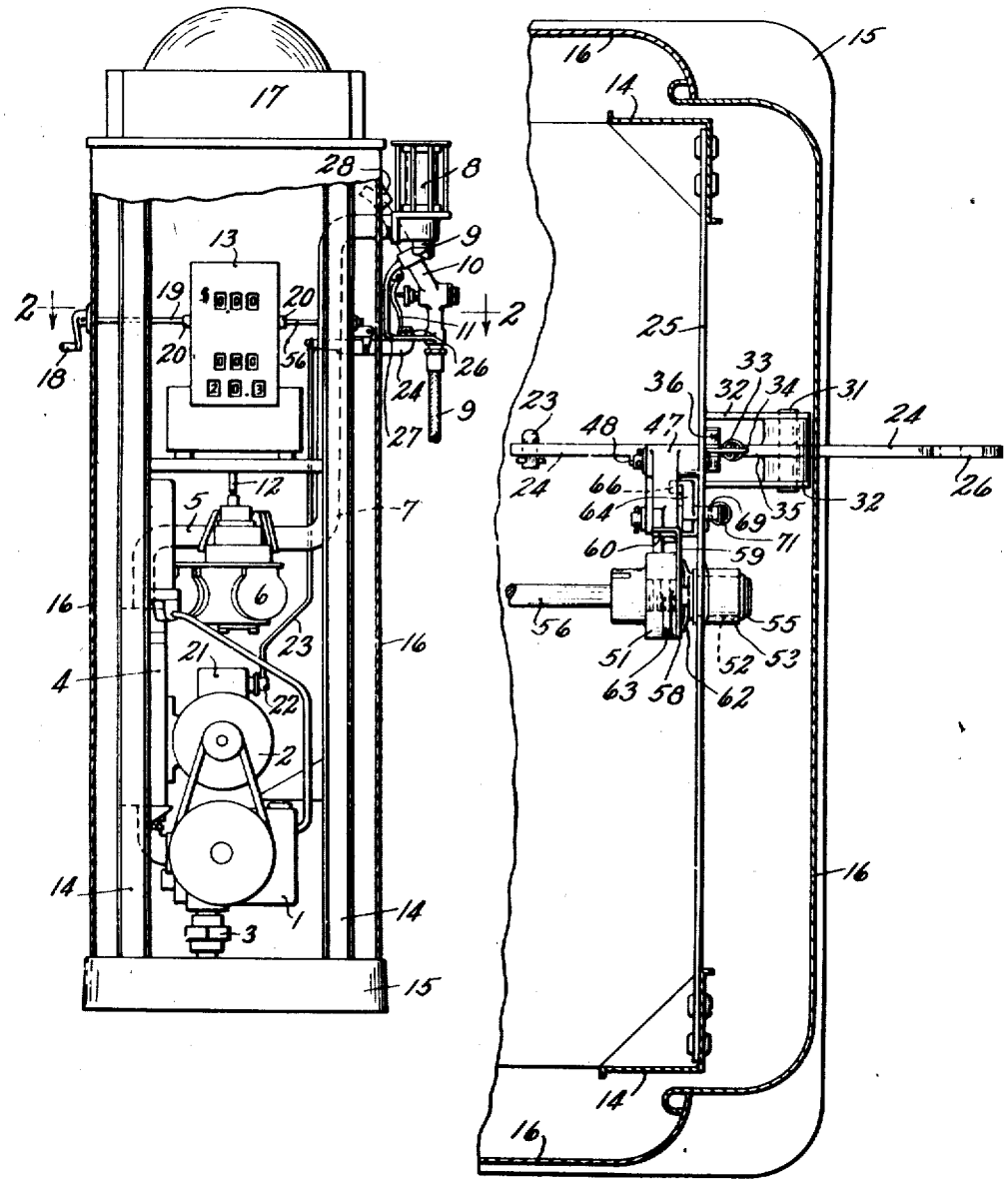

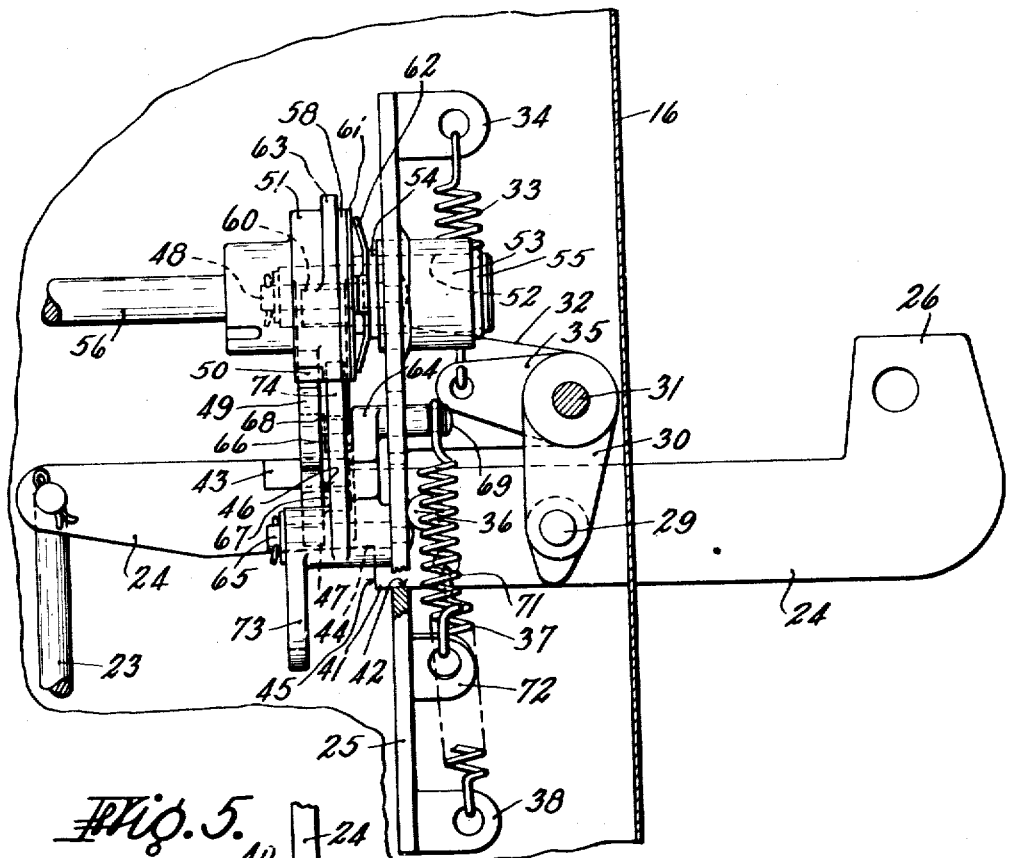
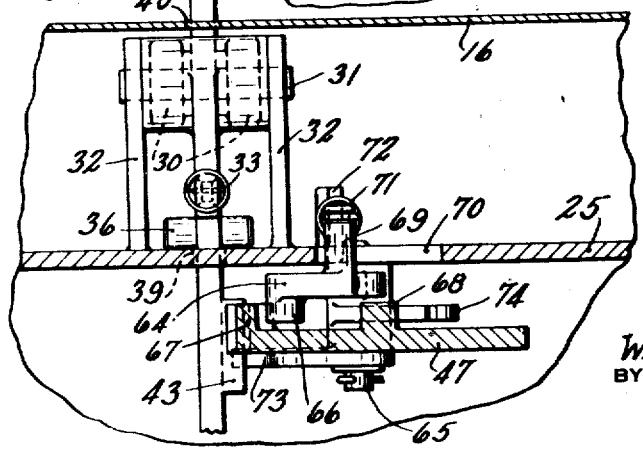

INVENTOR
WARREN H. DE LANCEY
BY Chapin & Neal
ATTORNEYS

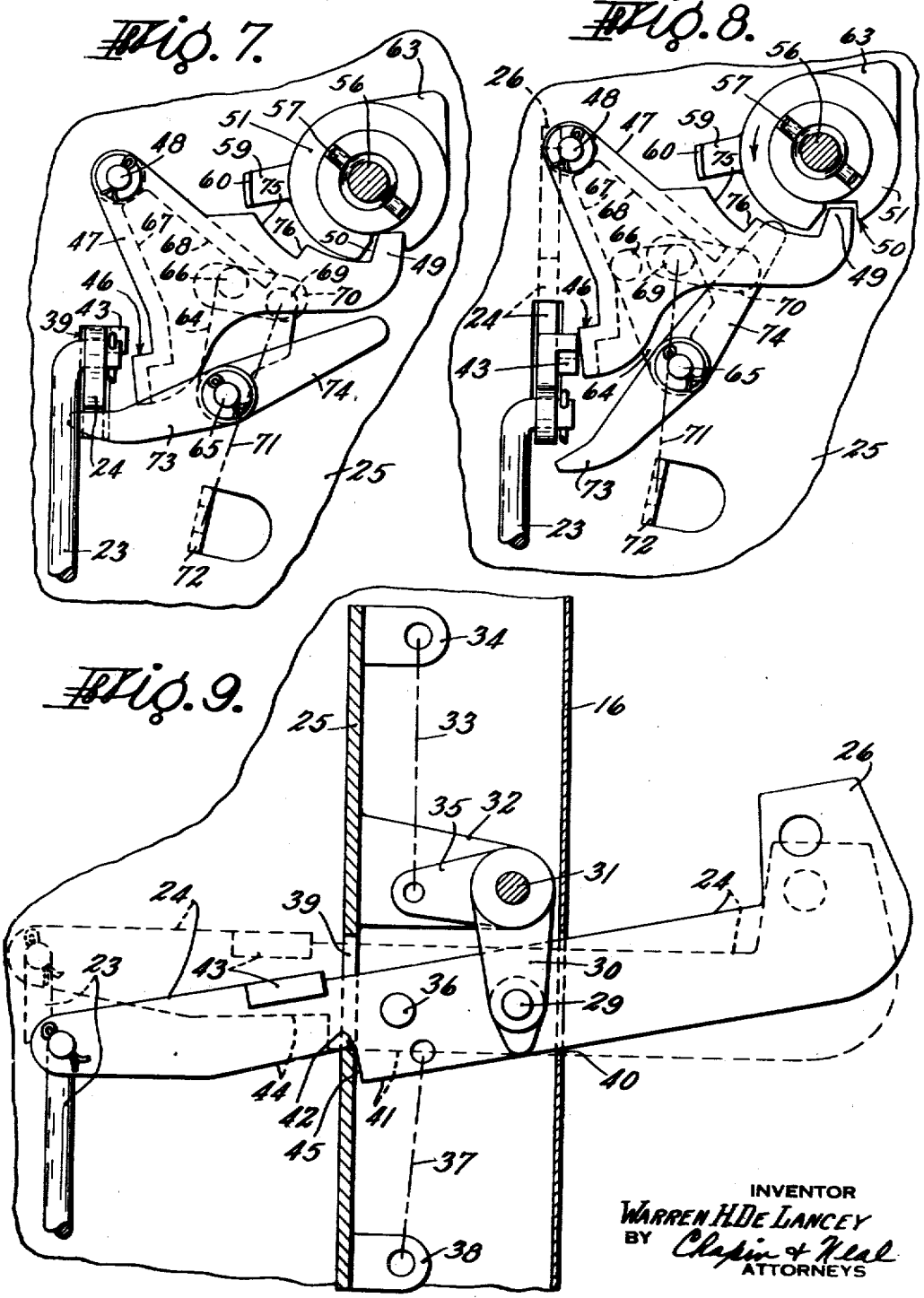

Patented Dec. 24, 1946

2,413,036

UNITED STATES PATENT OFFICE 2,413,036

FLUID DISPENSING APPARATUS

Warren H. De Lancey, Springfield, Mass., assignor to Gilbert & Barker Manufacturing Company, West Springfield, Mass., a corporation of Massachusetts Application March 31, 1945, Serial No. 585,919

10 Claims. (Cl. 222—74)

This invention relates to improvements in fluid dispensing apparatus, such for example as is used for dispensing measured quantities of gasoline and the like.

More particularly, the invention relates to an improved movable hose hook which is adapted to support the hose or hose nozzle of the dispensing apparatus when not in use and which is adapted by its movement to control the operation of the pump motor of the apparatus.

Movable hose hooks, for the purpose described, have been used heretofore and are shown in various forms in the prior art. A fully automatic hook, which will be moved to start the motor merely by the removal of the hose nozzle from the hook and which will be moved to stop the motor by the weight of the nozzle on the hook, is not generally acceptable because the accidental removal of the nozzle from the hook would start the pump motor and possibly at a time when the authorized attendant was not present. To guard against danger from the accidental or mischievous removal of the nozzle from the hook it is generally required that some intentional and deliberate movement, other than removal of the nozzle, be made by the operator in order to start the pump motor. The common practice, heretofore, has been to arrange the hose hook so that it has to be manually lifted to start the motor. The operator is supposed to remove the hose nozzle from the hook with one hand and then with the other hand lift the hook to start the pump motor. Actually, what usually happens is that the operator has in one hand the cap of the tank to be serviced and with the other hand he grasps the nozzle and removes it from the hook. Then, having both hands full, he moves the hose hook by striking it a blow with the hose nozzle. This frequently results in injury to the nozzle or the hook or both.

This invention has for an object a movable hose hook arrangement in which the intentional deliberate manual act required and the removal of the nozzle from the hook may be effected by the operator merely by using one hand.

More particularly, the invention has for an object to provide a hose hook which is held in motor-stopping position by means independent of the weight of the hose nozzle and which will automatically move to motor-starting position when the holding means is released by a manual movement of the nozzle while on the hook just prior to lifting of the nozzle from the hook.

In one particular embodiment of the invention a hose hook is so mounted that it must be manually pulled outwardly from the pump casing as a condition precedent to its upward swinging movement into motor-starting position, such upward movement then being automatically performed, and the hose hook can be pulled outwardly by pulling outwardly on the nozzle as an incident to the act of removing the nozzle from the hook without requiring the use of more than one hand and without any possibility of injury to the nozzle.

The invention also has for an object to provide improved means for interlocking the hose hook with the register-resetting means of the apparatus. Such interlocking is generally required and generally used but it is not indispensable and the invention may be used without it when the fluid dispensing apparatus is of such character that the precaution of the interlock is not required.

The invention will be disclosed with reference to the accompanying drawings, in which—

Fig. 1 is a small-scale sectional-elevational view of a gasoline measuring and dispensing apparatus having a control mechanism embodying the invention;

Fig. 2 is a fragmentary sectional plan view taken on the line 2—2 of Fig. 1 and drawn to a much larger scale;

Fig. 3 is a full-size side-elevational view of the control mechanism;

Fig. 5 is a fragmentary sectional plan view taken on the line 5—5 of Fig. 4;

Figs. 6, 7 and 8 are views taken similarly to Fig. 4 but showing the parts of the control mechanism in different relative positions; and Fig. 9 is a fragmentary sectional view taken on the line 9—9 of Fig. 4.

Figure 4:
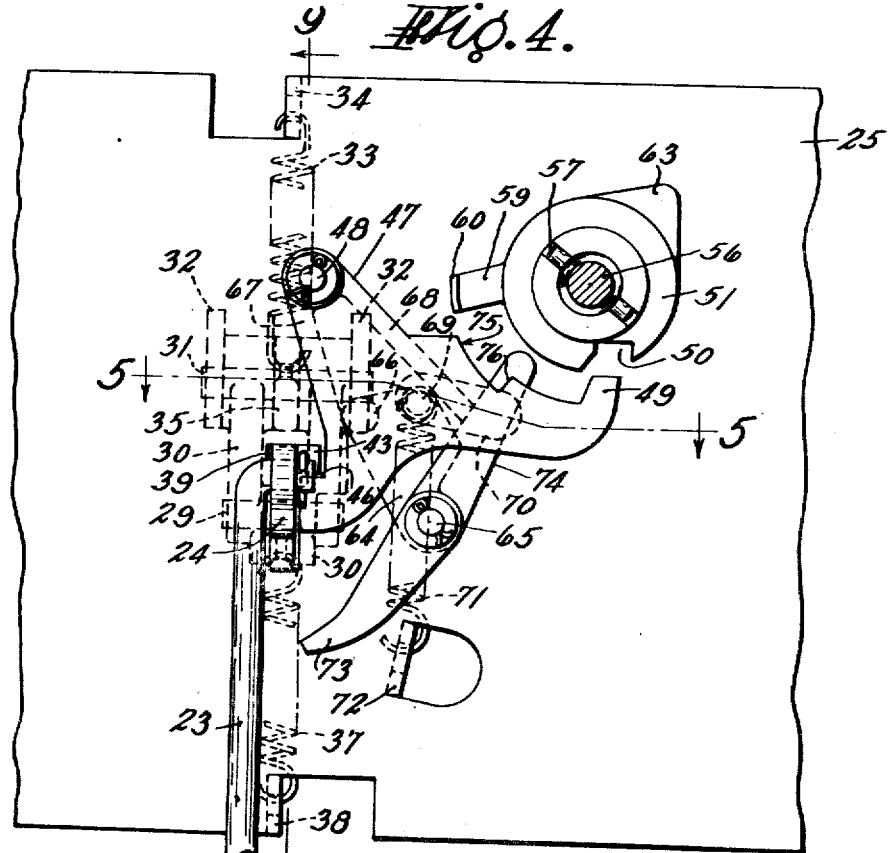
Fig. 4 is a view taken at right angles to, and from the left of, Fig. 3.
Figure 6:
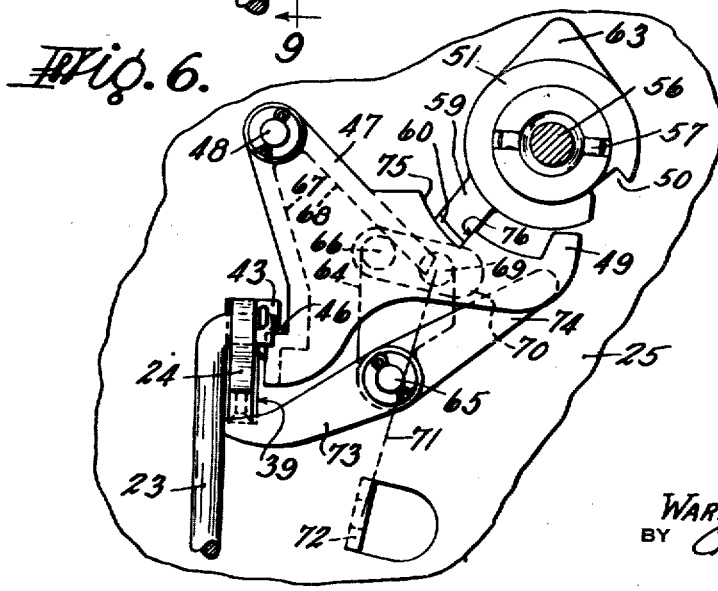

Referring to these drawings; there is shown in Fig. 1, by way of illustrative example, one form of gasoline measuring and dispensing apparatus in which the control mechanism of this invention may be embodied. In this apparatus, a pump 1, driven by an electric motor 2, is adapted to draw up gasoline from an underground storage tank (not shown) through a suction pipe 3 and force it into and through an air separator 4, a pipe 5, a meter 6, a pipe 7, a visible discharge indicator 8 and a flexible hose 9. On the outlet end of the hose is the usual valved hose nozzle 10, having a valve which is spring closed and may be manually opened by means of the pivoted lever 11. The pipes 3, 5, 7 and hose 9 constitute a dispensing conduit and the pump 1 a means for creating flow therethrough. The meter 6 drives by means of a shaft 12 a suitable register 13 which may indicate the quantity or the value or both quantity and value of the liquid dispensed. The pump, motor, separator, meter, register and piping are suitably supported from a frame which includes four angle iron columns 14 fixed to and upstanding from a base 15. Casing sections 16 enclose the space between the base 15 and a dome 17 and thus all the parts described, except for the indicator 8, hose 9, nozzle 10 and the window of the register 13. A handle 18, located outside the casing, is provided for resetting the register 13, such handle being fixed to a shaft 19 which connects with the resetting shaft 20 of the register. The motor 2 is controlled by a switch 21, having a lever 22 which is connected by a link 23 to a lever 24, located outside the pump casing.

The details of the particular dispensing apparatus, herein illustrated, are not essential to the present invention and may be varied as desired. This invention is directed primarily to an improved flow-control mechanism capable of general use in fluid dispensing apparatus irrespective of the kind of fluid dispensed. Hence, the invention is capable of use with other forms of fluid dispensing apparatus as well as other forms of gasoline dispensing apparatus differing specifically from the one herein disclosed.

Referring next to Fig. 2, the pump control lever 24 and the related parts of the control mechanism and interlock are mounted on a plate 25, suitably fixed at its ends one to each of two the angle iron columns 14, as indicated. The lever 24 is in the form of a so-called hose hook. It is pivotally supported at a point intermediate its ends. Its inner end is connected to the link 23 and its outer end is adapted to support the hose nozzle 10. The lever has an upstanding lug 26 which is adapted to extend upwardly through a slot in the guard 27 of the hose nozzle 10, when such nozzle is supported thereon by its guard as indicated in Fig. 1. This lug may, or may not, prevent operation of lever 11, when the nozzle is in place on the hose hook, both arrangements being common in the prior art. The lug 26 is perforated to receive the customary padlock, whereby the nozzle may be locked to its support. The upper end of the nozzle, when the latter is in place on hook 24, is adapted to be received in a sheltering boot, such as 28.

The hose hook 24 (Figs. 3 and 4) is pivotally supported on a stud 29 by and between a pair of laterally spaced and depending arms 30 of a bellcrank. The latter is pivotally supported on a stud 31, mounted at its ends in a pair of ears 32, fixed to and outstanding from plate 25. A spring 33, connected at one end to a lug 34 on plate 25 and at the other end to a horizontally inwardly extending arm 35 of the bellcrank, tends to swing the latter so as to move the hose hook pivot 29 toward the plate 25. A projection 36 (Figs. 3 and 5) on hook 24 is engageable with the outer face of plate 25 to limit the substantially horizontally inward movement of the hose hook 24. The hose hook is movable in a counterclockwise direction as viewed in Fig. 3, when released, by means of a spring 37 which is connected at one end to the hook at a point to the left of the pivot 29 and at its other end to an ear 38 struck out from, or otherwise suitably fixed to plate 25. The hose hook may be thus moved only after it has been relieved of the weight of the hose nozzle 10 and after it has also been unlocked as will hereinafter be explained. The plate 25 and casing 16 have slots 39 and 40, respectively, to receive and permit operation of the hose hook (Figs. 5 and 9). When the hose hook is in its off position, shown in Fig. 3 and by dotted lines in Fig. 9, it is substantially horizontal and a portion of its bottom edge 41 rests on the bottom wall 42 of slot 39 and pin 36 abuts the outer face of plate 25. The hose hook cannot then swing on its pivot enough to operate the motor switch. The hook may be pulled horizontally outward until a lug 43 on the hook abuts the inner face of plate 25. While the hook may thus be pulled outwardly far enough to cause the edge 41 to ride off the support 42, a latch, later to be described, supports the lug 43 and prevents downward movement of the hose hook. The inner portion of hook 24 has a bottom edge 44, which is offset upwardly from the edge 41 and which is connected to edge 41 by a right angular shoulder 45. When the aforesaid latch is released and the hook 24 pulled outwardly as far as possible, the edge 41 will ride off support 42 and the spring will pull the inner end of hook downwardly until the edge 44 rests on support 42 and the shoulder 45 engages the outer face of plate 25, all as shown by full lines in Fig. 9. The motor switch 21 will then be closed to start the motor 2 and operate pump 1. With the hook positioned as shown by full lines in Fig. 9, the weight of the hose nozzle on the outer portion of the hook will over-power spring 37 and swing the hook on its pivot 29 in a clockwise direction far enough to release the shoulder 45 from plate 25 and carry the edge 41 slightly above the support 42, whereupon spring 33 will move the hook inwardly.

The latch, which locks the hose hook 24 in off position, consists of a shoulder 46 (Figs. 3, 4, 7 and 8) formed on a rocker 47, pivotally mounted on a stud 48, fixed to the plate 25 and projecting inwardly therefrom. As will be clear from Fig. 3, this shoulder is long enough (measured in a direction longitudinally of the hose hook) to prevent the lug 43 from riding off it when the hose hook is pulled outwardly as far as possible. The shoulder 46 thus supports the hose hook, when pulled outwardly to the limit hereinbefore described and prevents the hook from swinging to any substantial degree on its pivot 29. When the hose hook is pulled out and the latch 46 is released, as shown in Fig. 7, the hose hook will be swung by spring 37 into the position shown by full lines in Fig. 9.

The rocker 47 serves as an interlock between the pump control, and the register-resetting means. It has a tooth 49 (Fig. 4) which is adapted to engage in a notch 50 in a disc 51, when the latch 46 is released from the lug 43 on the hose hook (see Fig. 7), and to disengage from said notch, when the hose hook is latched as shown in Fig. 4. The disc 51 has fixed thereto, as by the screw threads indicated in Fig. 2, a stud 52, which is rotatably mounted in a bearing 53 on plate 25 and held from axial displacement between a shoulder 54 on the stud and a snap ring 55, which fits in a groove in the outer end of the stud. The inner end of disc 51 (Fig. 4) is bored out and diametrically slotted to respectively receive the outer end of a shaft 56 and a pin 57, fixed to the shaft. This shaft 56 is connected as indicated in Fig. 1 to the resetting shaft 20 of the register.

Mounted on stud 52, between the back of disc 51 and the shoulder 54, is a disc 58, carrying a radially projecting arm 59, the outer end 60 of which is bent at right angles (Fig. 2) and parallels the axis of disc 51. A washer 61 and a star spring 62 are also mounted on stud 52, the spring pressing the washer against disc 59 and the latter against the back of disc 51. The disc 51 also carries a cam 63.

The rocker 47 is adapted to be shifted from one to the other of its extreme positions by toggle means. Such means includes an arm 64, the hub of which is pivotally mounted on a stud 65, fixed to and projecting rearwardly from plate 25. Projecting rearwardly from arm 64 is a stud 66 which lies in the space between two flanges 67 and 68 which project forwardly from rocker 47 and which diverge outwardly away from the pivot 48 of the rocker. The stud 66 by engagement with flange 67 is adapted to move the rocker clockwise, as viewed in Fig. 4, and by engagement with flange 68 is adapted to move the rocker counterclockwise. The arm 64 also carries a stud 69 which projects forwardly through a slot 70 in plate 25 and has its outer end connected by a spring 71 to a lug 72 struck outwardly from, or otherwise suitably fixed to, plate 25.

The toggle arm 64 is shiftable to swing the toggle spring 71 from one side to the other of pivot 65 by means of two arms 73 and 74, fixed to the hub of arm 64 and projecting radially outward in opposite directions therefrom. The arm 73 underlies the hose hook 24 and is adapted to be moved thereby when the hook swings downwardly to close the switch 21 for the purpose of swinging the spring 71 to the left of the axis of pivot 65 to carry stud 66 against flange 67 of rocker 47. The arm 74 (Fig. 3) lies in the plane of cam 63 and is adapted to be moved by the latter during the operation of the register-resetting mechanism for the purpose of shifting the toggle spring 71 to the right of the axis of pivot 65 to carry stud 66 against flange 68 of rocker 47.

The particular register-resetting mechanism illustrated is actuated by turning shafts 19, 20 and 56 by means of handle 18, through an angle of 400 degrees in a counterclockwise direction, as viewed in Figs. 4, 6, 7 and 8, and then releasing the handle, whereupon the shaft 56 will be automatically moved backwardly, or clockwise, through an angle of 40 degrees by means embodied in the register and not shown herein. The net movement of shaft 56 is thus 360 degrees. These shafts may not be turned in a clockwise direction. To prevent the dog 49 from moving into notch 50 after the disc 51 has been turned 360 degrees, the member 60 moves into the position shown in Fig. 6, engaging an arcuate surface 75 on rocker 47 and preventing clockwise movement of the rocker. The disc 58 will move with disc 51, while the latter is turned counterclockwise from the Fig. 4 position forty degrees into a position similar to the Fig. 6 position, in which further rotation of disc 58 in a counterclockwise direction is prevented by the abutment of the leading edge of member 60 with a radial shoulder 76 on the rocker 47. The disc 51 continues to turn counterclockwise until it completes its 400 degree movement and is in the position shown in Fig. 6. Then, as disc 51 moves back through the angle of 40 degrees, the disc 58 will again be frictionally driven by disc 52 and member 60 will be moved off the surface 75, allowing the dog 49 to enter notch 50 at the end of the movement. The resetting mechanism described is of an old and well known type.

The operation of the invention will next be described. With the hose nozzle 10 supported on the hose hook 24 in the lockup position shown in Fig. 1, the parts of the interlock mechanism occupy the relative positions shown in Fig. 4. The rocker 47 is being pressed by stud 66 and the toggle spring 71 against the flange 67 of the rocker thrusting it toward the hose hook 24 with its latch 46 underlying and supporting the lug 43 on the hose hook. At the same time, the rocker is so positioned that dog 49 is withdrawn from notch 50 and the register-resetting mechanism is unlocked and free to be turned by handle 18 when desired. The hose hook is locked against such swinging movement as is necessary in order to close the now open switch 21. The hose hook may, however, be pulled outwardly in a substantially horizontal direction but not enough to allow the lug 43 to ride off the latch 46.

To unlock the hose hook 24 operation of the resetting shaft 56 is required. This shaft, when turned as heretofore described through its resetting cycle, will carry cam 63 into engagement with the arm 74 and move it to the position shown in Fig. 6. The arm 64 is thus swung clockwise to carry the spring 71 to the right of pivot 65 and cause stud 66 to press against the flange 68 of rocker 47. The spring 71 thus tends to move the rocker 47 in a counterclockwise direction. The rocker cannot, however, be moved to release hose hook 24 until the resetting cycle is completed by the backward or clockwise movement of disc 51 from the Fig. 6 to the Fig. 7 position. Then, when member 60 rides off surface 75, the spring 71 will move the rocker to withdraw latch 46 from in under lug 43 and move dog 49 into the notch 50 in disc 51. The hose hook is thus unlocked, as shown in Fig. 7.

If now the hose hook is manually pulled outwardly, which may be done by means of the nozzle, and the weight of the nozzle is removed from the hose hook, the latter will be moved by spring 37, into the position shown in Fig. 8 and by full lines in Fig. 9. The motor switch 21 will thus be closed to cause actuation of the pump and the dispensing of gasoline in the usual manner. While dispensing takes place, the resetting mechanism cannot be actuated. While the shape of notch 51 is such as to allow the dog 49 to be cammed out of notch 50 on counterclockwise movement of the disc 51, the rocker 47 bears against the side of lug 43 on the hose hook 24 and prevents withdrawal of the dog from the notch. Thus, resetting of the register is positively prevented during dispensing of gasoline.

As the hose hook moves down to close switch 21, it engages the arm 73 and shifts the toggle spring 71 from the Fig. 7 to the Fig. 8 position. Thus, the spring 71 tends to move the rocker 47 clockwise in readiness to move latch 46 into hose-hook locking position and dog 49 into position to release the register-resetting mechanism.

On completion of the dispensing operation, the operator hangs the nozzle 10 on the hose hook and the weight of the nozzle moves its outer end downwardly and raises its inner end until the latch 46 snaps in under lug 43 and locks it against movement other than the substantially horizontal movement. The parts are restored to the positions shown in Fig. 4. The hose hook is locked against operation and the register resetting means is released for operation. The pump therefore cannot be operated while the register is being reset.

It will thus be seen that the hose hook arrangement is such that the nozzle can be removed from the hook and the hook moved to "on" position simply by the use of one hand of the operator. Having operated the register-resetting mechanism and thus unlocked the hose hook by withdrawing the latch 46 from supporting relation with lug 43, the operator grasps the nozzle 19 in the usual manner and pulls it outwardly, drawing the hose hook 24 outwardly until it is in position for the shoulder 45 to catch on the outer face of plate 25. If, as is usually the case, the operator has relieved the hook of part of the weight of the nozzle, by lifting it slightly, then the spring 37 will pull the rear part of the hook downwardly so as to latch it in its outwardly pulled position and subsequently swing the hook into motor-starting position, when the nozzle is removed from the hook. The required manual operation of the hook can thus be performed by the operator with one hand and in a convenient manner and as a natural incident to the act of removing the nozzle. With this arrangement, which requires the use of only one hand, the operator is not tempted, nor has he any occasion, to misuse the nozzle, as above described in connection with movable hose hooks of the prior art.

It is to be understood that the hose hook may be used without the interlock with the register-resetting means. That is, the lock provided by latch 46 may be omitted and the hook used in the form shown in Fig. 9. The hose hook is held in its flow-stopping position independently of the weight of the nozzle by the wall 42. It may be moved outwardly by pulling on the nozzle, while the latter is on the hook, far enough to release the hook from wall 42 and allow spring 37 to move the hook upwardly into flow starting position after the hook has been relieved of the weight of the nozzle. Replacement of the nozzle on the hook will move the hook downwardly to flow-stopping position and allow spring 33 to move the hook inwardly to hold the hook in this position independently of the nozzle. Mischievous or accidental removal of the nozzle will not cause movement of the hook to start the motor. For this purpose a deliberate and intentional act of the operator is required—a manual movement of the nozzle while on the hook to release the hook for swinging movement. The invention thus provides a movable hose hook with a means for holding it in flow-stopping position independently of the hose nozzle and, when such means is manually released, the hose hook moves automatically into flow-starting position on removal of the nozzle and moves automatically into flow-stopping position when the nozzle is replaced on the hook.

I claim:

1. In fluid dispensing apparatus, having a dispensing conduit including a flexible hose and means for creating a flow of fluid through said conduit, a support for the hose when not in use, said support being movable back and forth in one path between two positions and adapted when in one such position to start the flow-creating means and when in the other such position to stop such means, said support being held by the hose when supported thereon in flow-stopping position, said support being movable back and forth in another path between a first and a second terminal position, yieldable means for moving the support to and holding it in said first terminal position, means operable when the support is in said first terminal position to prevent its movement in the first-named path, and yieldable means operable when the support is manually moved to said second terminal position and relieved of the hose to move the support to flow-starting position.

2. In fluid dispensing apparatus, having a dispensing conduit including a flexible hose and means for creating a flow of fluid through said conduit, a support for the hose when not in use, said support being movable back and forth in one path between two positions and adapted when in one such position to start the flow-creating means and when in the other such position to stop said means, said support being held by the hose in flow-stopping position, said support being movable back and forth in another path between a first and a second terminal position, yieldable means for moving the support to and holding it in said first terminal position, means operable when the support is in the first terminal position to prevent its movement in the first-named path, yieldable means operable when the support is manually moved to the second terminal position and relieved of the hose to move the support to flow-starting position, and means for latching the support when moved in the second path to its second terminal position and holding it in such position, said latching means being releasable when the support moves to flow-stopping position to allow the first-named yieldable means to move the support in the second path to its first terminal position.

3. In fluid dispensing apparatus, having a dispensing conduit including a flexible hose, a meter interposed in said conduit to measure the fluid dispensed, a register driven by the meter, means for resetting the register, and means for creating a flow of fluid through said conduit and meter, a support for the hose when not in use, said support being movable back and forth in one path between two positions and adapted when in one such position to start the flow-creating means and when in the other such position to stop said means, said support being held by the hose in flow-stopping position, said support being movable back and forth in another path between a first and a second terminal position, yieldable means for moving the support to and holding it in said first terminal position, a latch for preventing movement of said support in the first-named path, means operable by said resetting means to release said latch, and yieldable means operable after release of said latch and after said support has been manually moved to the second terminal position and relieved of the hose to move the support to its flow-starting position.

4. In fluid dispensing apparatus, having a dispensing conduit including a flexible hose, a meter interposed in said conduit to measure the fluid dispensed, a register driven by the meter, means for resetting the register, and means for creating a flow of fluid through said conduit and meter, a support for the hose when not in use, said support being movable in one path between two positions and adapted when in one such position to start the flow-creating means and when in the other such position to stop said means, said support being held by the hose in flow-stopping position, said support being movable back and forth in another path between a first and a second terminal position, yieldable means for moving the support to and holding it in said first terminal position, a latch for preventing movement of said support in the first-named path, means operable by said resetting means to release said latch, yieldable means operable after release of said latch and after said support has been manually moved to its said second terminal position and relieved of the hose to move the support to flow-starting position, latching means for holding said support in said second position, said latching means being releasable when the support is moved to flow-stopping position to allow the first-named yieldable means to move the support to said first terminal position.

5. In dispensing apparatus, having a dispensing conduit including a flexible hose and means for creating a flow of fluid through said conduit, a support for the hose when not in use, said support being movable back and forth in one path between upper and lower terminal positions and adapted when in such upper and lower positions to respectively start and stop the flow-creating means, said support being movable by the weight of the hose into said lower position, said support being movable in another path between inner and outer terminal positions, yieldable means for moving the support to and holding it in said inner position, means operable when the support is in said inner position to prevent its movement in said first-named path, and yieldable means operable when the support is manually moved to its outer position and relieved of the weight of the hose to move the support to its upper position.

6. In dispensing apparatus, having a dispensing conduit including a flexible hose and means for creating a flow of fluid through said conduit, a support for the hose when not in use, said support being movable back and forth in one path between upper and lower terminal positions and adapted when in such upper and lower positions to respectively start and stop the flow-creating means, said support being movable by the weight of the hose into said lower position, said support being movable in another path between inner and outer terminal positions, yieldable means for moving the support to and holding it in said inner position, means operable when the support is in said inner position to prevent its movement in said first-named path, yieldable means operable when the support is manually moved to its outer position and relieved of the weight of the hose to move the support to its upper position, and means for latching the support in its outer and upper position, said latching means being releasable when the support is moved into its lower position under the weight of the hose to allow the first-named yieldable means to move the support to its inner position.

7. In fluid dispensing apparatus, having a dispensing conduit including a flexible hose, a meter interposed in said conduit to measure the fluid dispensed, a register driven by the meter, means for resetting the register, and means for creating a flow of fluid through said conduit and meter, a support for the hose when not in use, said support being movable back and forth in one path between upper and lower terminal positions and adapted when in such upper and lower positions to respectively start and stop said means, said support being movable by the weight of the hose into said lower position, said support being movable in another path between inner and outer terminal positions, yieldable means for moving the support to and holding it in said inner position, a latch for preventing movement of the support in the first-named path, means operable by actuation of said resetting means to release said latch, and yieldable means operable after release of said latch and after the support has been manually moved to its outer position and relieved of the weight of the hose to move the support into its upper position.

8. In fluid dispensing apparatus, having a dispensing conduit including a flexible hose, a meter interposed in said conduit to measure the fluid dispensed, a register driven by the meter, means for resetting the register, and means for creating a flow of fluid through said conduit and meter, a support for the hose when not in use, said support being movable back and forth in one path between upper and lower terminal positions and adapted when in such upper and lower positions to respectively start and stop said means, said support being movable by the weight of the hose into said lower position, said support being movable in another path between inner and outer terminal positions, yieldable means for moving the support to and holding it in said inner position, a latch for preventing movement of the support in the first-named path, means operable by actuation of said resetting means to release said latch, yieldable means operable after release of said latch and after the support has been manually moved to its outer position and relieved of the weight of the hose to move the support into its upper position, and means for latching the support in its outer and upper position, said latching means being releasable when the support moves into its lower position under the weight of the hose to allow the first-named yieldable means to move the support to its inner position.

9. In fluid dispensing apparatus, having a dispensing conduit including a flexible hose and means for creating a flow of fluid through said conduit, a pivoted hose hook for supporting the hose when not in use and swingable on its pivot from a lower position in which it stops the flow-creating means to an upper position in which it starts the flow-creating means, a fixed support having a slot therein, said hose hook being slidably received in said slot and projecting on both sides of the support, an arm pivoted at one end to and located on the outer side of said support and at its other end carrying the pivot on which said hook at a point intermediate its ends is pivotally supported, yieldable means for drawing said arm toward said support and moving the hook inwardly in the slot, means for limiting the inward movement of the hook, said hook having an inner portion located on the inner side of said support and of less width than the outer portion and a shoulder at the intersection of said portions, the wider outer portion being engaged in said slot when the hook is in its inner position and such engagement preventing any substantial swinging movement of the hook on its pivot, the narrow inner portion of the hook being engaged in the slot when the hook is manually pulled outwardly and enabling swinging movement of the hook on its pivot, yieldable means operable when the hook is drawn outwardly to swing the hook on its pivot and carry said shoulder into latching engagement with the outer face of said suport to hold the hook in its outer and upper position, said hook being movable by the weight of the nozzle into its lower position and releasing said shoulder from said face and enabling the hook to move inwardly by the first-named yieldable means.

10. In fluid dispensing apparatus, having a dispensing conduit including a flexible hose, a meter interposed in said conduit to measure the fluid dispensed, a register driven by the meter, means for resetting the register, and means for creating a flow of fluid through said conduit and meter, a support for the hose when not in use, said support being movable back and forth in one path between upper and lower terminal positions and adapted when in such upper and lower positions to respectively start and stop the flow-creating means, said support being movable by the weight of the hose into flow-stopping position, a shaft for actuating the resetting means and carrying an abutment and a cam located in parallel and adjacent planes and adjacent said hook with the axis of the shaft paralleling the hook, an abutment on the hook, a rocker having latches one at each of two opposite ends thereof, one said latch adapted to engage the abutment on said shaft to lock the resetting means and the other adapted to engage the hose hook abutment to lock the hook against movement, said rocker when moved to engage one latch with one abutment releasing the other latch from the other abutment, said rocker having two flanges projecting from one face, a pivoted toggle lever having a projection extending between said flanges, and adapted by engagement with one or the other thereof to move the rocker to one or the other of its extreme positions, a toggle spring for such arm, and arms on the toggle lever one underlying the hose hook and one located in the plane of said cam the hose hook when moved to its upper position engaging and moving one arm to shift the toggle lever and its spring into position to subsequently move the rocker toward the hook and cause one latch to engage and lock the hook against movement when the hook moves into its lower position, the cam during operation of the resetting means adapted to engage and move the other arm to shift the toggle lever and its spring into position to subsequently move the rocker toward the shaft to cause the other latch to engage the shaft abutment and lock the resetting means when the hook is unlocked.

WARREN H. DE LANCEY.